(12) United States Patent
Hagedorn et al.

(10) Patent No.: US 12,122,092 B2
(45) Date of Patent: Oct. 22, 2024

(54) CALIBRATION METHOD FOR A SYSTEM FOR POWDER BED-BASED GENERATING OF THREE-DIMENSIONAL COMPONENTS BY MEANS OF ELECTROMAGNETIC RADIATION

(71) Applicant: Aconity GmbH, Herzogenrath (DE)

(72) Inventors: Yves-Christian Hagedorn, Aachen (DE); Andreas Görres, Aachen (DE); Lutz Lübbert, Würselen (DE); Hendrik Blom, Dortmund (DE)

(73) Assignee: Aconity GmbH, Herzogenrath (DE)

( * ) Notice: Subject to any disclaimer, the term of this patent is extended or adjusted under 35 U.S.C. 154(b) by 322 days.

(21) Appl. No.: 17/292,976

(22) PCT Filed: Nov. 12, 2019

(86) PCT No.: PCT/EP2019/081020
§ 371 (c)(1),
(2) Date: May 11, 2021

(87) PCT Pub. No.: WO2020/099402
PCT Pub. Date: May 22, 2020

(65) Prior Publication Data
US 2022/0024122 A1 Jan. 27, 2022

(30) Foreign Application Priority Data

Nov. 12, 2018 (DE) .......................... 102018128279.6

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/31* (2021.01); *B22F 12/222* (2021.01);
(Continued)

(58) Field of Classification Search
CPC ... B29C 64/153; B29C 64/232; B29C 64/245; B29C 64/268; B29C 64/286; B29C 64/393; B33Y 10/00; B33Y 50/02
See application file for complete search history.

(56) References Cited

U.S. PATENT DOCUMENTS

| 10,994,526 B2 | 5/2021 | Hagedorn et al. |
| 2010/0125356 A1 | 5/2010 | Shkolnik et al. |

(Continued)

FOREIGN PATENT DOCUMENTS

| DE | 19649865 C1 | 2/1998 |
| DE | 102013208651 A1 | 11/2014 |

(Continued)

OTHER PUBLICATIONS

Preliminary Report on Patentability of the International Searching Authority in English from corresponding Patent Cooperation Treaty (PCT) Application No. PCT/EP2019/081020, completed Feb. 3, 2021.

(Continued)

*Primary Examiner* — Farah Taufiq
(74) *Attorney, Agent, or Firm* — Gardner, Linn, Burkhart & Ondersma LLP

(57) ABSTRACT

A calibration method for a system for powder bed-based generating of three-dimensional components by means of electromagnetic radiation, in particular such as a PBLS system, having a radiation source deflection unit and a raisable and lowerable carrier plate, above which a component is built, where, in order to calibrate the radiation source (Continued)

deflection unit, at least one virtual reference mark is used and, by means of a detector, a target-actual deviation between the virtual reference mark and a beam of the radiation source deflection unit is determined. An improved calibration method is achieved in that the at least one virtual reference mark is projected on a reference surface, which can travel vertically by means of the raisable and lowerable carrier plate, and independently of the vertical position thereof.

17 Claims, 13 Drawing Sheets

(51) Int. Cl.
| | |
|---|---|
| *B22F 10/31* | (2021.01) |
| *B22F 12/00* | (2021.01) |
| *B22F 12/30* | (2021.01) |
| *B22F 12/90* | (2021.01) |
| *B29C 64/232* | (2017.01) |
| *B29C 64/245* | (2017.01) |
| *B29C 64/268* | (2017.01) |
| *B29C 64/286* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC .............. *B22F 12/30* (2021.01); *B22F 12/90* (2021.01); *B29C 64/232* (2017.08); *B29C 64/245* (2017.08); *B29C 64/268* (2017.08); *B29C 64/286* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2018/0093416 A1* | 4/2018 | Prexler | .................. B33Y 10/00 |
| 2018/0281067 A1* | 10/2018 | Small | ..................... B22F 12/44 |
| 2018/0297275 A1 | 10/2018 | Hagedorn et al. | |
| 2018/0297283 A1 | 10/2018 | Hagedorn et al. | |

FOREIGN PATENT DOCUMENTS

| | | |
|---|---|---|
| DE | 102015011013 A1 | 2/2016 |
| DE | 102016200043 A1 | 7/2017 |
| DE | 102016106403 A1 | 10/2017 |
| DE | 102016011801 A1 | 4/2018 |
| DE | 102017202725 B3 | 7/2018 |
| EP | 3351323 A1 | 7/2018 |
| EP | 3527352 A1 | 8/2019 |
| WO | 2016081651 A1 | 5/2016 |

OTHER PUBLICATIONS

International Search Report of the International Searching Authority from corresponding Patent Cooperation Treaty (PCT) Application No. PCT/EP2019/081020 indicated completed on Feb. 17, 2020.
International Written Opinion of the International Searching Authority from corresponding Patent Cooperation Treaty (PCT) Application No. PCT/EP2019/081020, indicated completed on Feb. 17, 2020.
International Preliminary Report on Patentability of the International Searching Authority from corresponding Patent Cooperation Treaty (PCT) Application No. PCT/EP2019/081020, indicated completed on Feb. 3, 2021.

* cited by examiner

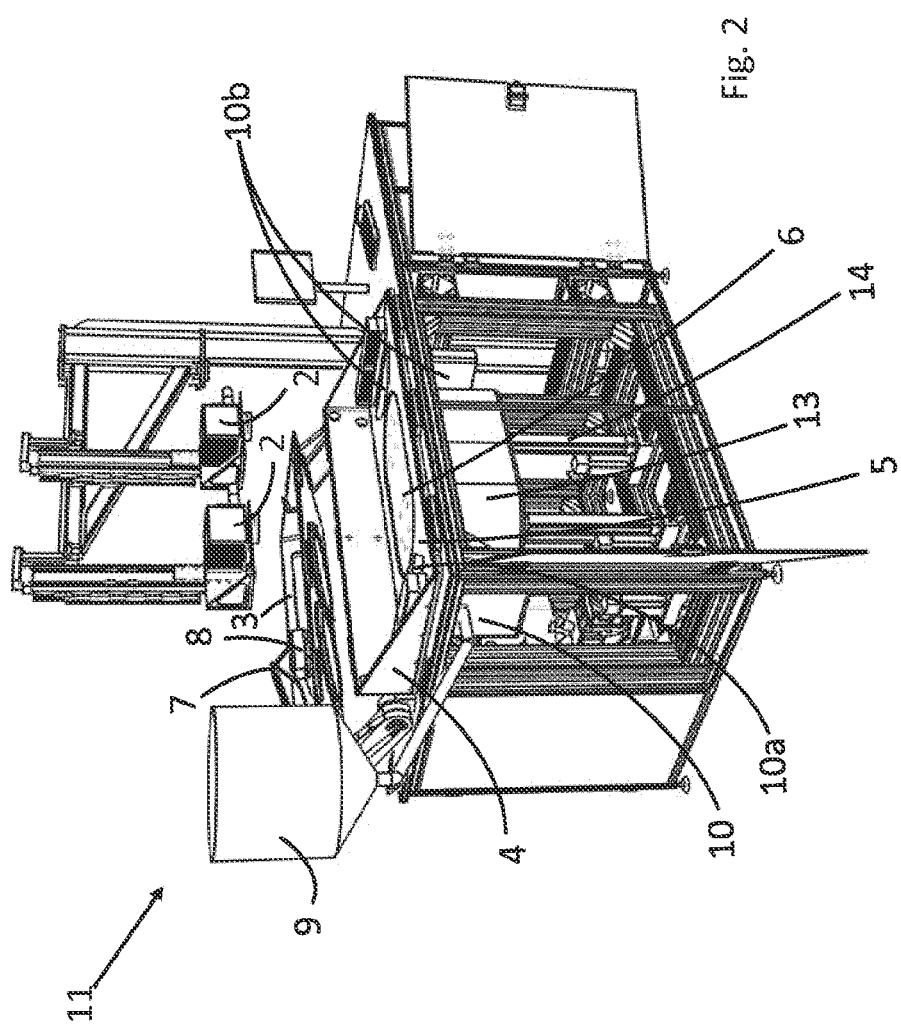

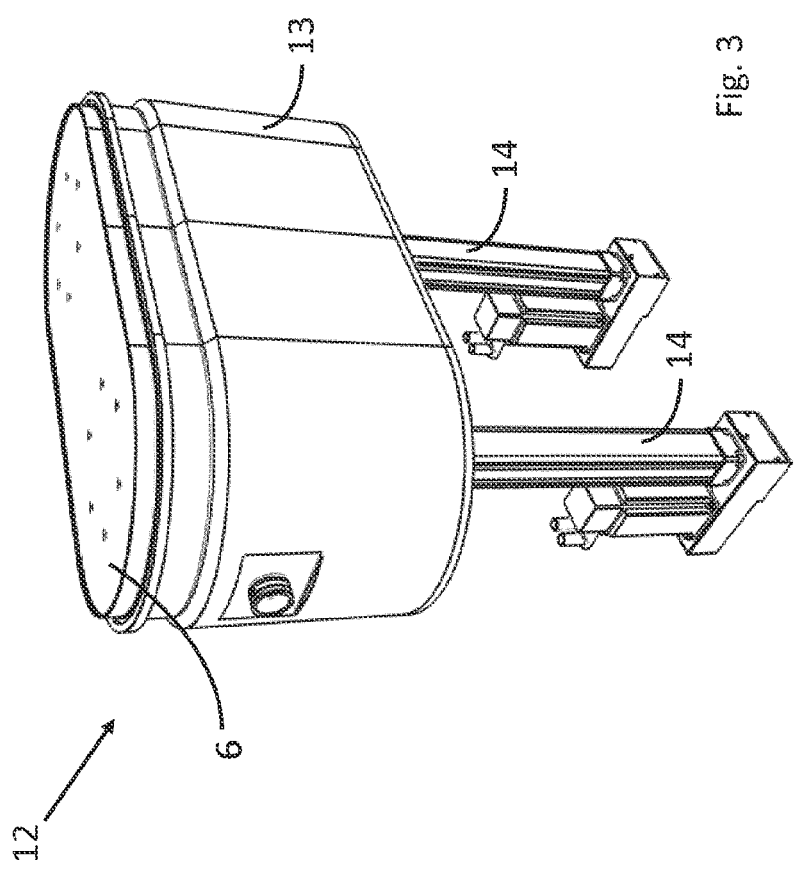

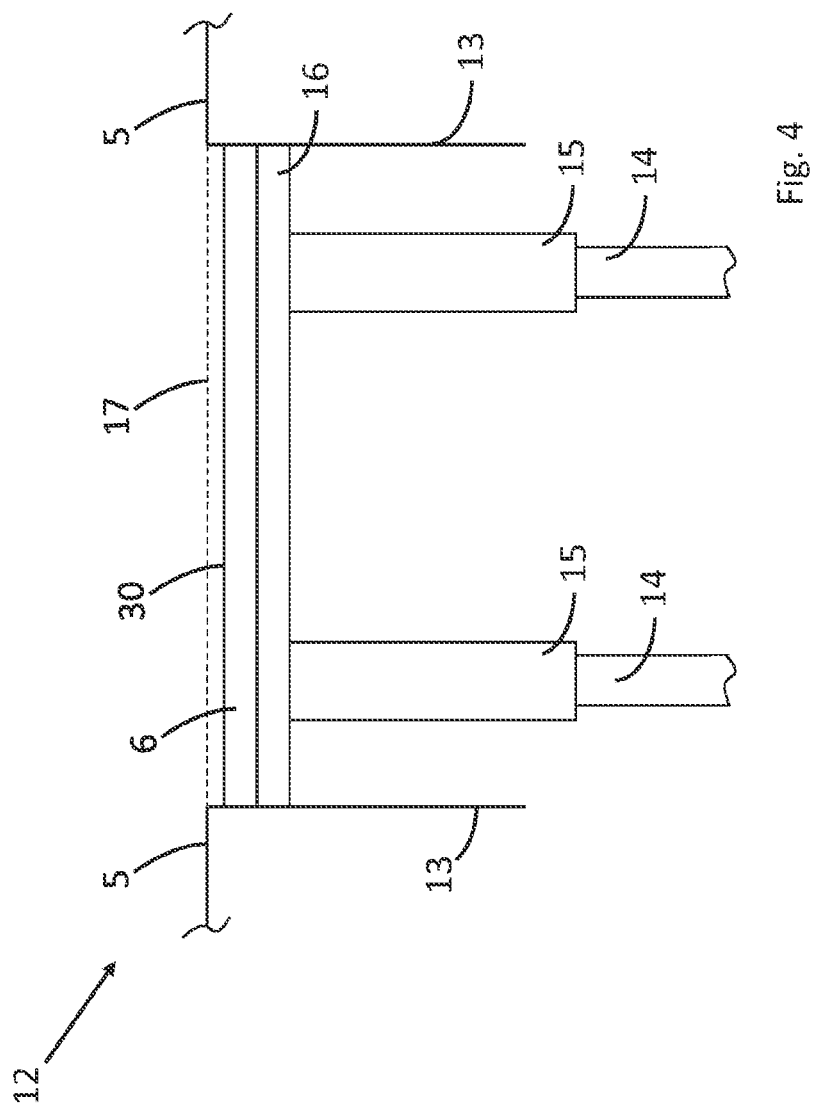

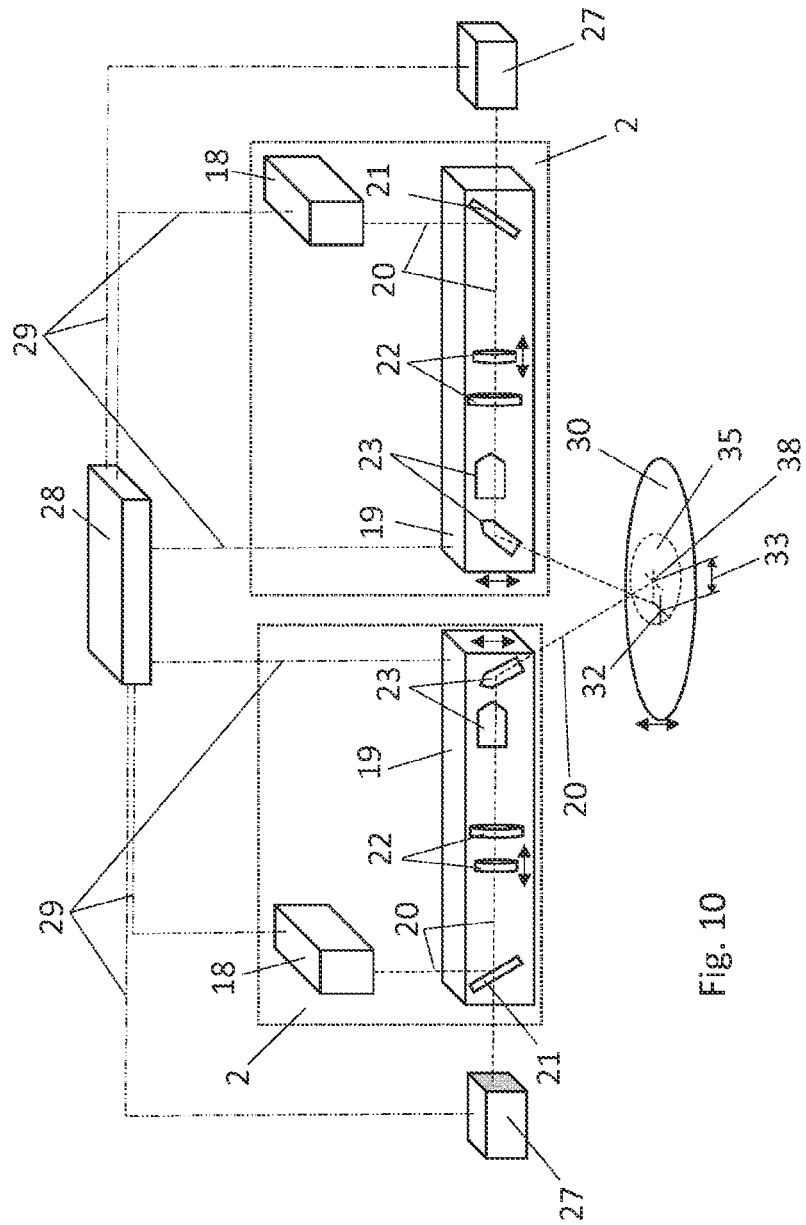

CALIBRATION METHOD FOR A SYSTEM FOR POWDER BED-BASED GENERATING OF THREE-DIMENSIONAL COMPONENTS BY MEANS OF ELECTROMAGNETIC RADIATION

CROSS REFERENCE TO RELATED APPLICATION

The present application claims the priority benefits of International Patent Application No. PCT/EP2019/081020, filed Nov. 12, 2019, and claims benefit of German patent application no. de 10 2018 128 279.6, filed on Nov. 12, 2018.

BACKGROUND OF THE INVENTION

Powder-bed-based laser melting (PBLM) is a form of powder-bed-based production of three-dimensional components by means of electromagnetic radiation. PBLM, for which the term of selective laser melting is also used, belongs to the group of generative manufacturing methods which are also referred to as additive manufacturing (AM) methods. PBLM is known e.g. from the German patent DE 196 49 865 C1. In powder-bed-based production by means of electromagnetic radiation, it is possible to produce three-dimensional components in a mouldless manner, i.e. without tools or moulds, and almost without restrictions in relation to the geometric complexity of the component. The above-mentioned methods are to be distinguished in particular from selective laser sintering and from laser deposition welding. In the case of the above-mentioned methods and in particular in the case of PBLM, components are produced in layers from a material which initially is in powder form, in particular in the form of synthetic materials or metals, which—unlike in the case of laser deposition welding—is provided in layers as a resting powder bed and—unlike in the case of selective laser sintering—is completely melted and solidifies without the addition of binding agents. The components produced by means of these methods have mechanical properties which largely correspond to those of the base material or to those of the components which are produced from the base material by means of conventional methods.

Calibration methods for PBLM systems are known which require a calibration unit which must be physically introduced into the process chamber of the PBLM system. In addition, e.g. from DE 10 2013 208 651 A1, calibration methods are known which are based on burning a test pattern into the powder. However, these methods are unsuitable for carrying out calibration within a build job since the scanned reference pattern can coincide in location with the component being produced and can therefore reduce the quality of the component to be built.

DE 10 2017 202 725 B3 discloses that a physical calibration structure outside the build area can be used for the calibration of laser scanner units with respect to each other. In this case, sensors are disposed in such a way that a back-reflection of the calibration structure irradiated by the laser scanner unit can be detected. Such a procedure allows the calibration of a plurality of laser scanner units even during a process but only on condition that the calibration structure is located outside the build area. Therefore, the build area available for the build job is reduced since the coverage area of the laser scanner units used must also extend outside the build area for calibration purposes.

DE 10 2016 011 801 A1 discloses that the introduction of signal with a first laser scanner unit and the evaluation of the signal with a second laser scanner unit can be used for calibration purposes. In this case, an evaluation device in the form of a camera is disposed in such a way that it is guided coaxially to the laser radiation of the second laser scanner unit. This proposed approach allows only relative calibration of individual laser scanner units with respect to each other. It is not possible to allow for drifts of the scanner systems, such as through thermal influences or mechanical setting. In addition, this method, just like the method known from DE 10 2016 106 403 A1, is limited to the working plane.

SUMMARY OF THE INVENTION

The invention provides an improved calibration method for a system for powder-bed-based production of three-dimensional components by means of electromagnetic radiation and a corresponding system for powder-bed-based production of three-dimensional components by means of electromagnetic radiation, with which a micrometre-precise orientation of the respective beams is made possible, such as in order to avoid, for example, pores, cavities or clearly visible offsets in the region of the beam overlap at the respective component contour.

In accordance with an aspect of the invention, an improved calibration method for a system for powder-bed-based production of three-dimensional components by means of electromagnetic radiation, in particular a PBLM system, with a beam source deflection unit which, in particular in the case of an PBLM system, is designed as a laser scanner unit, and with a support plate which can be raised and lowered, above which a component is built up, wherein for calibration of the beam source deflection unit at least one virtual reference mark is used and by means of a detector a target-actual deviation between the virtual reference mark and a beam of the beam source deflection unit is determined, is provided in that the at least one virtual reference mark is projected onto a reference surface which can be moved vertically by means of the support plate which can be raised and lowered, the projection being independent of the vertical position of the reference surface.

In other words, the invention renders possible the calibration of at least one beam source deflection unit with the aid of at least one virtual reference mark on a vertically movable reference surface serving as a projection surface and preferably being a horizontal reference plane. The reference surface can be moved vertically by means of the support plate, which can be raised and lowered, and can be formed by the support plate itself, by a build platform disposed thereon or by build material disposed thereon and also referred to as a substrate, which is in particular in powder form or in an already solidified state. The support plate forms the movable floor of a component reservoir which, with an upper opening opposite the floor, adjoins the working plane and extends below the working plane. In this case, the support plate is fitted in the manner of a piston inside the side wall of the reservoir extending at a right angle to the floor and is movable in order to be able to be lowered incrementally in relation to the working plane. By means of a drive, e.g. in the form of an electromechanical lifting cylinder, ball screw, belt drive, pneumatic or hydraulic drive, the support plate can be raised or lowered within the component reservoir and also beyond same. As soon as the build platform is provided, it is supported by the support plate and is disposed thereon, e.g. laid or releasably fastened, in particular screwed or clamped, thereon. The build platform can be formed e.g. from a substrate plate, from which the finished component must be separated, or a preform which becomes part of the component. In a particularly advantageous manner, by means of the calibration in accordance with the invention, precise orientation on a preform is carried out in order to meet the preset connection structures with micrometre precision.

In an advantageous manner, the at least one virtual reference mark is projected onto the reference surface and this is effected independently of the vertical position of the reference surface and therefore in particular independently of whether the reference surface is located below, above or in a working plane of the system for powder-bed-based production of three-dimensional components by means of electromagnetic radiation. In particular, it is also feasible that the at least one virtual reference mark is projected onto the reference surface while the latter is located outside—i.e. below or above—the working plane of the system for powder-bed-based production of three-dimensional components by means of electromagnetic radiation. Since the reference mark is virtual and is therefore not physically provided within the build chamber, its geometry can be adapted in each case to the application to be calibrated, e.g. can be enlarged, reduced or distorted, whereby calibration of the beam source deflection units is no longer necessary exclusively in relation to the working plane. It is also feasible to produce a virtual reference geometry which includes a plurality of such reference marks, wherein the reference marks can be produced and detected simultaneously or sequentially.

The beam source deflection unit comprises a beam source for generation and emission of electromagnetic beams, in particular a laser beam source in the case of an PBLM system, by means of which the beam, in particular the laser beam, is generated and emitted, and a deflection unit, by means of which the beam can be changed with respect to its propagation direction, in particular by means of a preferably movable deflecting mirror or mirrors, and with respect to its lateral expansion, in particular by means of a preferably movable focussing lens or lenses. The beam source deflection unit can be moved in the horizontal and/or vertical direction and therefore permits adjustment of the relative position and thus in particular the distance between the reference surface and the beam source deflection unit. Therefore, the calibration can take place independently of the working plane, or a beam of the beam source deflection unit can be generated which is deliberately not focussed. When the beam strikes the preferably planar reference surface, its lateral expansion can be detected at that location by the detector as a cross-sectional surface. A beam which strikes a planar reference surface extending at a right angle to the beam has a round cross-sectional surface in this reference surface or projection surface and therefore has a circular lateral expansion starting from the associated cross-sectional centre point which serves as a reference point. A beam which does not strike a planar reference surface a right angle has an elliptical cross-sectional surface in this reference surface or projection surface and therefore has an elliptical lateral expansion starting from the associated cross-sectional centre point which serves as a reference point. If the reference surface is non-planar, in particular if the reference surface or projection surface is formed by powder, the beam can have a cross-sectional surface deviating from the previously mentioned cross-sectional surfaces and have a reference point representing this deviating surface. The respective reference point is used for determination of the target-actual deviation and can be calculated and/or defined e.g. by a control unit of the system for powder-bed-based production of three-dimensional components by means of electromagnetic radiation. The deflection unit permits guidance—also referred to as scanning—of the beam, in particular of the laser beam, over a powder layer for thermal manipulation, preferably melting, of same. In an alternative embodiment, the beam generated by the beam source can also be directed past the deflection unit directly onto the build platform or powder at that location.

The use of a plurality of beam source deflection units, which then form a multi-deflection unit system, in a multi-scanner system can increase productivity. The beam source deflection units can be moved individually or together in the horizontal and/or vertical direction and therefore permit adjustment of the relative position and thus in particular the distance between the reference surface and the beam source deflection units. Therefore, the calibration can take place independently of the working plane, or a beam of a beam source deflection unit can be generated which is deliberately not focussed.

In order to be able to make the overlap region of two or more adjacent beam source deflection units as large as possible within a multi-scanner system, so-called 3D laser scanner units which are characterised by a very compact construction are used in PBLM systems. The respective 3D laser scanner unit has at least one movable focussing lens which also has/have at least one deflecting mirror disposed downstream of it/them in the beam path, and thus permits, for each individual laser scanner unit, a coverage area, which is enlarged with comparable focus sizes, with respect to a 2D laser scanner unit in which a static focussing lens is disposed in the beam path after the last deflecting mirror. The combination of at least two 3D laser scanner units in a compact housing thus permits the beam outputs of the laser scanner units to be selected to be particularly close together. This physical proximity of the beam outputs of the laser scanner units permits the overlap area to be covered while at the same time having small focus sizes of <80 µm and strong scanning dynamics with scanning rates of >10 m/s In a particular embodiment, the reference mark and/or reference geometry can be adapted in such a way, in dependence upon the material to be processed, and in particular its reflectivity in the wavelength range and/or intensity range used, in order to produce reference mark and/or a reference geometry, that a significant determination of the measurement values required for calibration of the beam source deflection units is always ensured. The method is thus applicable independently of the material which forms the reference surface, and its properties such as e.g. powder as opposed to solid material or glossy as opposed to matt surfaces. For example, in the case of a matt surface and therefore low reflectivity of the material to be processed, a reference mark can be produced in a first wavelength range and/or intensity range, in the case of a surface which is glossy compared to the matt surface and therefore in the case of higher reflectivity of the material to be processed, a reference mark can be produced in a second wavelength range and/or intensity range different from the first.

In a first embodiment, an absolute reference mark, is produced as a virtual reference mark, in particular by a device of the system for powder-bed-based production of three-dimensional components by means of electromagnetic radiation, which device is different from the beam source deflection unit. The device for production of the absolute reference mark can be disposed statically or movably in or on the system for powder-bed-based production of three-dimensional components by means of electromagnetic radiation. The device comprises one or a plurality of beam sources which in particular is/are designed in such a way that electromagnetic beams with a high beam density can be output. The wavelength spectrum which can be produced by each of the beam sources of the device can extend from ultraviolet to infrared. The absolute reference mark can thus be e.g. a mark produced by an electromagnetic beam of the device on the reference surface and having a round cross-sectional surface or an elliptical cross-sectional surface or a cross-sectional surface deviating from the above-mentioned cross-sectional surfaces, with a reference point representing the respective cross-sectional surface. It is also feasible to produce an absolute reference geometry comprising a plurality of reference marks, which e.g. is rendered possible by a template in the device or a projector of the device. If powder is applied to the build platform, it does not melt during projection of the absolute reference marks onto the reference surface and therefore produces no penetration in the powder since the intensity of the electromagnetic beams is adjusted slightly according to the material used.

Provision can be made in a particular manner that, by means of the at least one absolute reference mark, focus calibration, i.e. compensation for target-actual deviation, of the beam source deflection unit is carried out and, for this purpose by means of the detector, a target-actual deviation between the absolute reference mark and a beam of the beam source deflection unit is determined and a setting of the beam source deflection unit and/or of the beam, e.g. by horizontal and/or vertical movement and setting of the beam source deflection unit and/or focussing lens(es) and/or deflecting mirror, is corrected in order to minimise or to eliminate the determined target-actual deviation or to adjust it to a desired value. The term 'focus calibration' designates the compensation for a present deviation of the lateral actual expansion of the beam of the beam source deflection unit from the lateral actual expansion of the absolute reference mark in the reference surface and/or the compensation for a present target-actual deviation of the actual intensity of the beam of the beam source deflection unit from a target intensity which is desired and/or can be produced as a maximum by the beam source deflection unit. If the beam of the beam source deflection unit to be calibrated thus has a larger or smaller lateral actual expansion than the absolute reference mark on the reference surface, the lateral actual expansion of the beam of the beam source deflection unit to be calibrated is adapted to the lateral actual expansion of the absolute reference mark, or the lateral actual expansion of the beam of the beam source deflection unit is laid over the lateral actual expansion of the absolute reference mark. If the beam of the beam source deflection unit to be calibrated thus has an actual intensity deviating from the desired intensity, the actual intensity of the beam of the beam source deflection unit is adjusted to the desired, e.g. maximum, intensity. A combined calibration by means of the lateral expansion and the intensity is also feasible. By means of the focus calibration, the focus shifting of individual beams of a beam source deflection unit caused by thermal influences, and the resulting positioning offset between a plurality of beams during a build job can be compensated for. Alternatively, beam source deflection units, on which no focus calibration has been carried out or an appropriately selected focus calibration has been carried out, can also be used to melt powder over a relatively large surface.

In a particular manner, provision can be made that, by means of the at least one absolute reference mark, a position calibration, i.e. an orientation correction or compensation for a target-actual deviation, of the beam source deflection unit, is carried out and for this purpose, by means of the detector, a target-actual deviation between the absolute reference mark and a beam of the beam source deflection unit is determined and a setting of the beam source deflection unit and/or of the beam, e.g. by horizontal and/or vertical movement and setting of the beam source deflection unit and/or focussing lens(es) and/or deflecting mirror, is corrected in order to minimise or eliminate the determined target-actual deviation or to adjust it to a desired value. The term 'position calibration' designates the minimisation, elimination or adjustment of a present deviation of the beam—generated by the beam source deflection unit and striking the reference surface—from the absolute reference mark, which is projected thereto, in the lateral direction with respect to the reference surface. In other words, the lateral deviation between the beams of the beam source deflection unit and the absolute reference mark is thus checked and, if a deviation is detected, a lateral orientation of the beam source deflection unit is carried out in order to minimise or eliminate the determined target-actual deviation or to adjust it to a desired value.

In one step of the position calibration, by means of the device an absolute reference mark is thus produced with a corresponding cross-sectional surface on the reference surface. In a further step, a beam is generated by the beam source deflection unit to be calibrated and is projected onto the reference surface with a corresponding cross-sectional surface. In an additional step, the target-actual deviation between the absolute reference mark and the beam of the beam source deflection unit to be calibrated, in particular between the respective reference points of the cross-sectional surfaces is detected by means of the detector, which can be one of the detectors described in more detail hereinunder, and a corresponding adjustment of the beam source deflection unit is carried out on the basis of the target-actual deviation.

In a particular manner, by means of the at least one absolute reference mark, focus calibration of a second, preferably of each further, beam source deflection unit of the system for powder-bed-based production of three-dimensional components by means of electromagnetic radiation is carried out.

In a particular manner, by means of the at least one absolute reference mark, position calibration of a second, preferably of each further, beam source deflection unit of the system for powder-bed-based production of three-dimensional components by means of electromagnetic radiation is carried out.

If the system for powder-bed-based production of three-dimensional components by means of electromagnetic radiation thus has more than one beam source deflection unit and is accordingly designed as a multi-scanner system, one, each or a plurality of the beam source deflection units can also be orientated by means of the one or more absolute reference mark(s) according to the previously described focus calibration and/or position calibration. It is particularly advantageous that in this sense, individual beam source deflection units can be focus-calibrated and/or position-calibrated without all of the beam source deflection units having to be focus-calibrated and/or position-calibrated.

The above-mentioned position calibrations can each be carried out after or before an above-mentioned focus calibration or without such focus calibration. It is thus possible to select whether one or each or a plurality of beam source deflection unit(s) is/are position-calibrated and focus-calibrated or one or each or a plurality of beam source deflection unit(s) is/are only position-calibrated or only focus-calibrated.

In a second embodiment, a relative reference mark is produced as a virtual reference mark by the beam source deflection unit. As the device producing the absolute reference mark, the beam source deflection unit producing the relative reference mark(s) can be a constituent part—which is movable, in particular three-dimensionally—of the system for powder-bed-based production of three-dimensional components by means of electromagnetic radiation. However, embodiments are also feasible in which the beam source deflection unit has a lower number of degrees of freedom. In a particularly advantageous manner provision is made that, even when using a beam source deflection unit for production of a relative reference mark no penetration in the powder is caused in that the relative reference mark is produced by a beam which has an intensity which does not cause any melting of the powder.

In an advantageous manner provision can be made that, preferably after the focus calibration of a first beam source deflection unit carried out by means of the at least one absolute reference mark, focus calibration of a second, preferably each further, beam source deflection unit is carried out by means of the first beam source deflection unit and for this purpose, by means of the detector, a target-actual deviation between a beam of the first beam source deflection unit, which produces the relative reference mark, and a beam of the second, preferably each further, beam source deflection unit is determined in relation to the reference surface, and a setting of the second beam source deflection unit and/or of the beam is corrected in order to minimise or eliminate the determined target-actual deviation or to adjust it to a desired value. If the system for powder-bed-based production of three-dimensional components by means of electromagnetic radiation thus has more than one beam source deflection unit and is accordingly designed as a multi-scanner system, one, each or a plurality of the beam source deflection units can also be orientated by means of a first beam source deflection unit according to the previously described focus calibration.

In an advantageous manner, position calibration of a second beam source deflection unit in relation to the relative reference mark is carried out and for this purpose, by means of the detector, a target-actual deviation between the relative reference mark and a beam of the second beam source deflection unit in relation to the reference surface is determined, and a setting of the second beam source deflection unit and/or of the beam is corrected in order to minimise or eliminate the determined target-actual deviation or to adjust it to a desired value.

In one step, a relative reference mark is produced by means of the beam source deflection unit and is projected onto the reference surface with a corresponding cross-sectional surface. In a further step, a beam is generated by the beam source deflection unit to be calibrated and is projected onto the reference surface with a corresponding cross-sectional surface. In an additional step, the lateral target-actual deviation between the relative reference mark and the beam of the beam source deflection unit to be calibrated, in particular between the respective reference points of the cross-sectional surfaces is detected by means of the detector, which can be one of the detectors described in more detail hereinunder, and a corresponding adjustment of the second beam source deflection unit is carried out on the basis of the target-actual deviation. Each further beam source deflection unit can be position-calibrated according to the previously described procedure. In an advantageous manner, individual beam source deflection units can be calibrated without having to calibrate all the beam source deflection units.

In an advantageous manner, in order to determine the target-actual deviation within the position calibration and/or the focus calibration at least one detector is used. In a first embodiment of the detector, this is a general detector which is disposed, in particular centrally, above the reference surface and preferably comprises a camera and is used to determine the target-actual deviation between each reference mark and the beam of each beam source deflection unit. For this purpose, the detection range of the general detector is equal to or larger than the reference surface.

In a second embodiment of the detector, this is a local detector which is allocated in particular to one of the beam source deflection units and preferably comprises a camera and is used to determine the target-actual deviation between each reference mark and the beam of the beam source deflection unit allocated to said detector. The detection range of the detector then at least partially coincides with the coverage area of the allocated beam source deflection unit. The orientation of the detection range of the detector is changed together with, and in particular in the same form as, the orientation of the coverage area of the beam source deflection unit. Embodiments are also feasible, in which a plurality of local or general detectors or a combination of one or more local and one or more general detectors is used.

In an advantageous manner, by means of the detector, focus calibration of the beam source deflection unit is carried out and for this purpose, by means of the local and/or general detector, a target-actual deviation between a lateral target expansion and/or target intensity, which is e.g. determined arithmetically and is preset for the beam generated by the beam source deflection unit, and a lateral actual expansion and/or actual intensity of a beam generated by the beam source deflection unit is determined in particular in each case in relation to the reference surface, and a setting of the beam source deflection unit and/or of the beam is corrected in order to minimise or eliminate the determined target-actual deviation on the reference surface or to adjust it to a desired value. In other words, the detector(s) make(s) focus calibration possible in that the lateral actual expansion of a beam of a beam source deflection unit is measured at the reference surface and is compared with the target expansion of the beam in relation thereto. Thus, if the beam of the beam source deflection unit to be calibrated has a larger or smaller lateral actual expansion than target expansion on the reference surface, the actual expansion of the beam source deflection unit is adapted to the target expansion.

Furthermore, it is advantageous that the position calibration and/or the focus calibration is carried out prior to and/or during a build job. In particular, the provision of a virtual reference geometry on a reference surface which can be raised and lowered by the support plate permits the calibration of one or a plurality of beam source deflection units during a build job. It is particularly advantageous that potential displacements of the beams of the respective beam source deflection unit, caused by thermal loading or mechanical setting, can be compensated for during the build job. Advantageously, by means of the possibility of being able to calibrate individual beam source deflection units of a multi-scanner system, use of the other beam source deflection units to process the workpiece during calibration of individual beam source deflection units is ensured.

Advantageously, an interpolation and/or extrapolation of supporting points, which are used for orientation of a beam source deflection unit, is carried out in order thereby to reduce the number of reference marks to be produced for calibration purposes. The main advantage of this reduction is that compensation for displacements of the beam of a beam source deflection unit owing to thermal loading can be carried out on the basis of real-time evaluation so that the optical system to be measured is subject to thermal usage conditions during the calibration. Calibration is preferably to be carried out within a minute, preferably within 30 seconds.

The calibration method in accordance with the invention using a control unit can preferably be used for a system for powder-bed-based production of three-dimensional components by means of electromagnetic radiation, in particular for a PBLM system, wherein the control unit is arranged and designed to control the system in such a way that the calibration method described above is carried out. During calibration, the control unit is used for evaluation of the data from the detector(s) and then, on the basis thereof, sets the corresponding adjustment of the beam source deflection unit being calibrated including the beam generated and emitted thereby. For this purpose, the control unit is connected via signal connections to each beam source deflection unit, each unit for production of absolute reference marks and each detector. The control unit is preferably the same control unit that is also used for control purposes during the powder-bed-based production of three-dimensional components by means of electromagnetic radiation, in particular the PBLM method.

In an advantageous manner, the calibration method in accordance with the invention can be used for a system for powder-bed-based production of three-dimensional components by means of electromagnetic radiation, in particular a PBLM system, with a support plate which can be raised and lowered and a beam source deflection unit, wherein the system comprises the above-described control device and a general and/or local detector and is arranged and designed to carry out the above-described calibration method by means of the relative reference mark, or comprises the above-described control unit, a device for producing absolute reference marks and a general and/or local detector and is arranged and designed therewith to carry out the above-described calibration method by means of the absolute and/or relative reference mark.

If the system for powder-bed-based production of three-dimensional components by means of electromagnetic radiation is a PBLM system, it also comprises a process chamber which has a chamber floor and within which at least the application medium is disposed and movably mounted in a conventional manner. In order to prevent oxidation-induced contamination of the material during the melting process, PBLM is performed under vacuum or in a protective gas atmosphere. As a result, relative component densities of more than 99% can be achieved by means of PBLM. For this purpose, the process chamber is formed to be gas-tight and a vacuum or an appropriate protective gas atmosphere, in particular an inert gas atmosphere with argon, nitrogen or helium, is generated and maintained therein. A vacuum or protective gas atmosphere also prevails in the component reservoir with the support plate and the build platform, a storage reservoir which may be present, a powder reservoir and a powder overflow of the PBLM system, for which reason these are attached to the process chamber in an appropriately gas-tight manner.

In the case of the PBLM method which can be performed on a corresponding PBLM system, the movable application medium which can be designed e.g. as a brush, blade or rubber lip, can be used to apply a first thin powder layer of the material to be processed at a uniform layer thickness of typically 10 to 100 μm onto a build platform. The application medium is typically attached to a pusher which is appropriately movably mounted for moving the application medium as required, in particular is mounted for movement in translation and parallel to the chamber floor. The build platform is in this case first disposed in a starting position in which the build platform is located with its surface below—by the amount of the desired layer thickness—a horizontally extending working plane generally formed by the chamber floor or in the proximity thereof, i.e. up to about 3 mm above the chamber floor. The application medium can be moved above and in parallel with the working plane by the pusher in order to push or apply the powder onto the build platform.

From a powder reservoir disposed next to the build platform, a so-called bottom-up powder conveying mechanism can provide powder, in particular during on-going operation of the PBLM system. Upon passage over the powder reservoir, which, by means of the bottom-up powder conveying mechanism, conveys powder from below the chamber floor in the direction of the chamber floor and at that location provides it for the application medium via an opening in the powder reservoir, and over the component reservoir with the build platform, the application medium completely spans the opening of the respective reservoir in order to be able to produce a uniform powder layer with the most planar possible surface between the build platform and the working plane. Subsequently, the powder of the applied layer is preferably completely melted selectively or locally by means of a laser beam, i.e. only in regions selected according to a 3D CAD model of the component to be manufactured, wherein porous structures can also be produced. Starting from the starting position, the build platform, after melting of the selected regions of the first powder layer, is lowered by the amount of a further desired layer thickness, and a further powder layer is applied to the respectively previous layer, is melted and hereby compacted and joined to the previous layer. In this case, at least one of the previous layers is melted again at least partially in order to ensure an integrally joined connection to the following layer. This cycle is repeated with a plurality of powder layers. The complete melting and subsequent solidification of the selected regions in the respective powder layer causes the material to be compacted in layers to form the component to be manufactured. By means of the selective melting of selected regions in each powder layer, a powder bed which consists of non-melted powder of all applied layers and surrounds the component is also built up in the component reservoir between the build platform and the working plane. In order to remove the component from the powder bed, the floor of the component reservoir formed by the build platform is raised in the direction of the working plane and thus in the direction of an upper opening of the component reservoir opposite the floor, and the build platform, to which the component is integrally joined via the first layer, is removed from the PBLM system. The component is subsequently separated, e.g. sawn off, from the build platform. Alternatively, the separation step can be omitted if the build platform is a preform which has become part of the component.

Exemplified embodiments of the invention will be explained in greater detail hereinafter with reference to the drawings.

BRIEF DESCRIPTION OF THE DRAWINGS

FIG. 2 shows a view of a multi-scanner PBLM system with two laser scanner units and an opened process chamber, FIG. 3 shows a view of a component reservoir, FIG. 4 shows a schematic cross-sectional view of the component reservoir of FIG. 3, FIG. 10 shows a schematic illustration of a position calibration of one of two laser scanner units of the multi-scanner PBLM system by means of a relative reference mark and of a local detector.

DETAILED DESCRIPTION OF THE PREFERRED EMBODIMENTS

Figure 1:
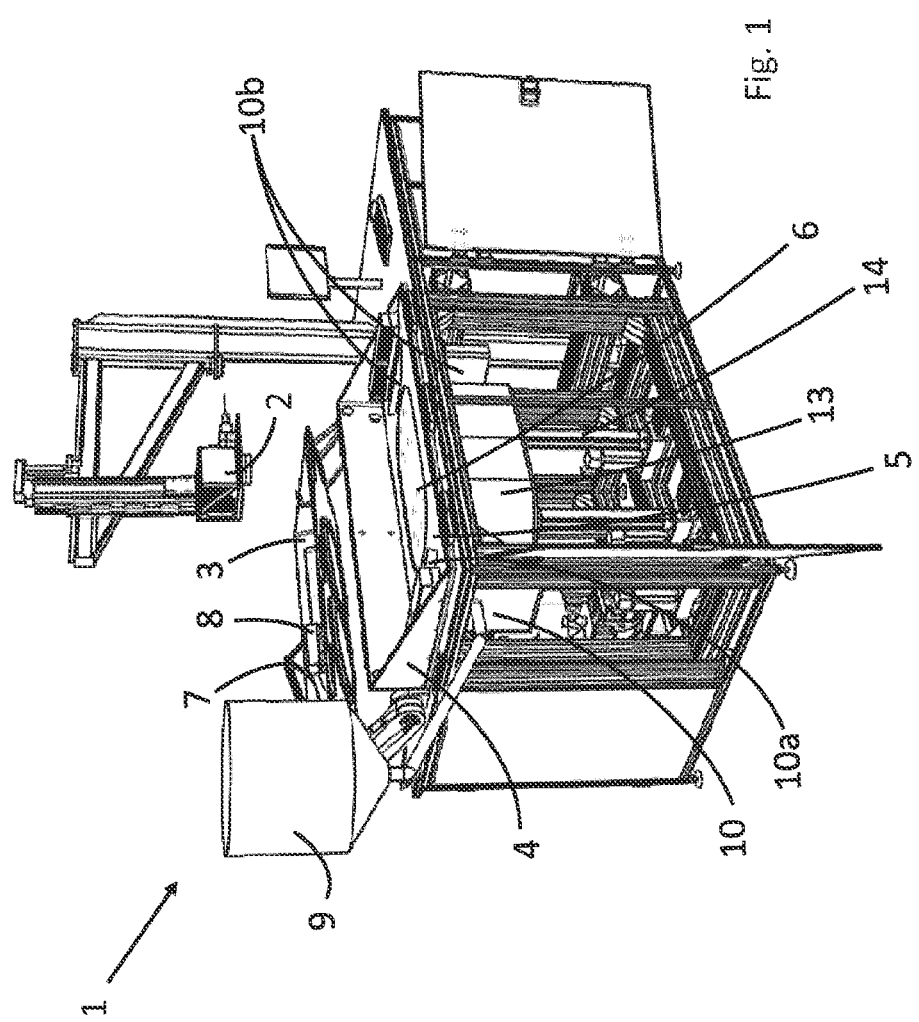
FIG. 1 shows a view of an PBLM system with a laser scanner unit and an opened process chamber.

FIG. 1 shows a view of a PBLM system 1 with a beam source deflection unit formed as a laser scanner unit 2. The PBLM system 1 comprises a process chamber which comprises a process chamber upper part 3 and a process chamber lower part 4. Via at least one opening which is provided in the upper part 3 and which is closed in a gas-tight manner e.g. by means of glass, beams from the scanner unit 2 disposed outside the process chamber can be coupled into the process chamber. The lower part 4 is closed at the bottom by means of a chamber floor 5 of the process chamber. In the illustrated view, the process chamber is opened, for which purpose the upper part 3 has been pivoted upwards and laterally away from the stationary lower part 4 and the chamber floor 5, thus forming a hinged opening. A pusher 8 is mounted so as to move in a translational movement parallel to a chamber floor 5 of the process chamber on an inner side of the process chamber upper part 3. An application medium 7, which can be formed e.g. as a brush, blade or rubber lip, is fastened to the pusher 8 so that, when the process chamber is closed, a movement of the pusher 8 can move the application medium 7 in a translational movement and parallel to the chamber floor 5 of the process chamber. The application medium 7 is used to distribute or discharge powder on a build platform 6 which can be raised and lowered vertically with respect to the chamber floor 5. For this purpose the application medium 7 spans the build platform 6 transversely to its movement direction when the process chamber is closed. The powder is conveyed out of a powder reservoir 10 next to the build platform 6 via a so-called bottom-up powder conveying mechanism from below the chamber floor 5 in the direction of the chamber floor 5 and at that location is provided for the application medium 7 via an opening 10a in the powder reservoir 10. The powder reservoir 10 or the bottom-up powder conveying mechanism thereof can be supplied with powder, in particular during on-going operation of the PBLM system 1, via a storage reservoir 9 connected to the powder reservoir 10. The component is produced on the build platform 6 by means of the above-described PBLM method. A powder overflow 10b is disposed at a side of the build platform 6—as seen in the movement direction of the pusher 8 or of the application medium 7—opposite the powder reservoir 10a, said powder overflow receiving excess powder which, during the passage over the build platform 6 was not discharged thereto by the application medium 7. The build platform 6 is accordingly disposed between the powder reservoir 10 and the powder overflow 10b.

FIG. 2 shows a view of a multi-scanner PBLM system 11 with two laser scanner units 2 which are both allocated to the build platform 6. Alternatively, the multi-scanner PBLM system 11 can also have more than two laser scanner units. Otherwise, the statements relating to FIG. 1 also apply to the PBLM system 1 illustrated in FIG. 2.

FIG. 3 shows a view of a component reservoir 12. This is defined laterally by the component reservoir side wall 13. The build platform 6 is fitted corresponding to the base surface of the component reservoir 12 within its component reservoir side wall 13. The build platform 6 can be formed e.g. from a substrate plate, from which the finished component must be separated, or a preform which becomes part of the component. The build platform 6 is supported by a support plate 16, not illustrated in FIG. 3 (see FIG. 4), which in turn can be vertically raised and lowered jointly with the build platform 6 within the component reservoir 12 via a lifting drive. The lifting drive can comprise e.g. an electro-mechanical lifting cylinder, ball screw, belt drive, pneumatic or hydraulic drive. In the present example, the lifting drive comprises one or a plurality of drive blocks 15 (see FIG. 4) connected to the support plate 16, which can then be moved vertically along one or a plurality of drive rails 14.

FIG. 4 shows a schematic cross-sectional view of the component reservoir 12 described in relation to FIG. 3. The support plate 16 forms the movable floor of the component reservoir 12 which, together with an upper opening opposite the floor, adjoins the working plane 17 below the working plane 17. In this case, the support plate 16 is fitted in the manner of a piston inside the component reservoir side wall 13 of the component reservoir 12, extending at a right angle to the floor, and is movable in order to be able to be lowered or raised incrementally by the lifting drive in relation to the working plane 17. The build platform 6 is supported by the support plate 16 and is disposed thereon, e.g. laid or releasably fastened, in particular screwed or clamped, thereon. A reference surface 30 is formed by the build platform 6 disposed on the support plate 16. Otherwise, the statements relating to FIG. 3 also apply to the component reservoir 12 illustrated in FIG. 4.

Figure 5A:
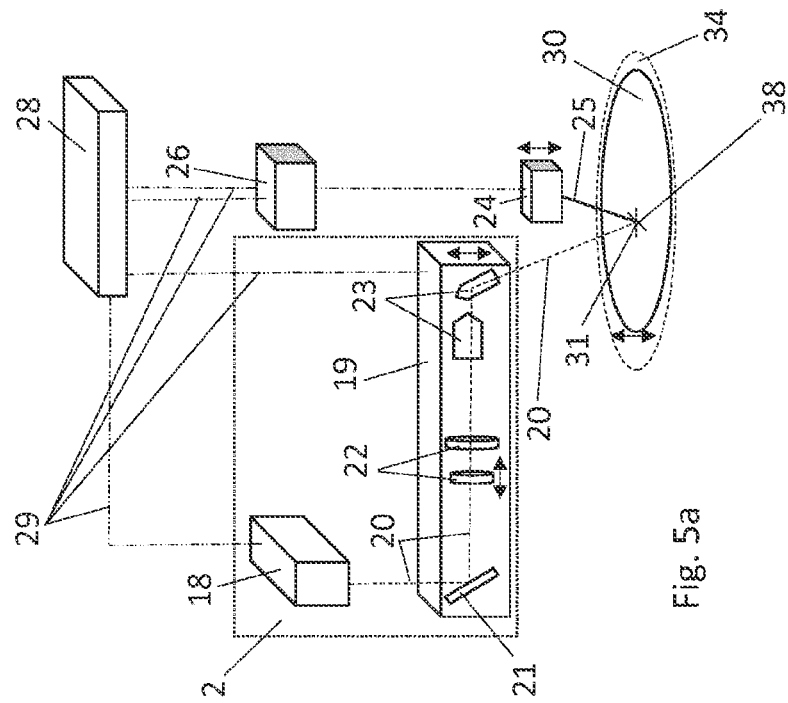
FIG. 5a shows a schematic illustration after the position calibration described in relation to FIG. 5.
Figure 5:
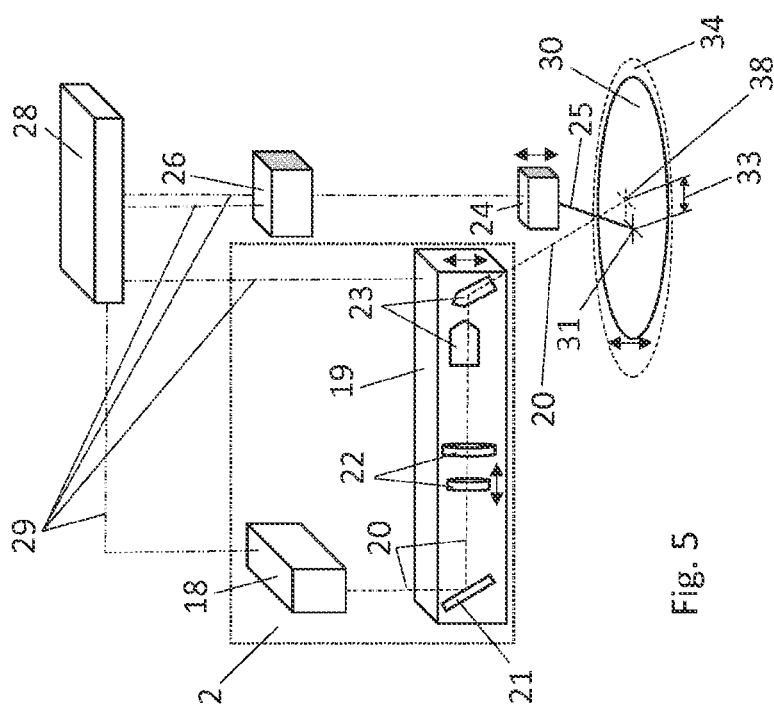
FIG. 5 shows a schematic illustration of a position calibration of the laser scanner unit of the PBLM system by means of an absolute reference mark and of a general detector.

FIG. 5 shows a schematic illustration of a position calibration of the laser scanner unit 2 of the PBLM system 1 by means of a virtual absolute reference mark and of a general detector 26. The construction required for this position calibration comprises—in addition to the laser scanner unit 2, the general detector 26 and a unit 24 producing the virtual absolute reference mark—a control unit 28 and a reference surface 30, onto which the absolute reference mark and the laser beam 20 of the laser scanner unit 2 are projected. The laser scanner unit 2 comprises a laser beam source 18 and a deflection unit 19. The deflection unit 19 comprises a deflecting mirror 21, two focussing lenses 22, of which at least one is movable, and two deflecting mirrors 23. The laser scanner unit 2 can move in the horizontal and/or vertical direction. The unit 24 and the reference surface 30 can be moved vertically by raising/lowering the support plate 16. This therefore makes it possible to adjust the relative position and in particular the distance between the reference surface 30 and the laser scanner unit 2 and the unit 24.

The general detector 26 has a detection range 34 which is larger than the reference surface 30. For the purposes of the position calibration, the laser scanner unit 2 is actuated by the control unit 28 via the signal connection 29 so that this control unit generates a laser beam 20 which is projected onto the reference surface 30 with a corresponding cross-sectional surface (not illustrated). In addition, the unit 24 is actuated by the control unit 28 via the signal connection 29 so that it generates an electromagnetic beam 25 which projects onto the reference surface 30 the absolute reference mark with a corresponding cross-sectional surface (not illustrated). After detection of the cross-sectional surfaces of the beams 20, 25 projected onto the reference surface 30 by the general detector 26, a corresponding signal is transmitted via the signal connection 29 between general detector 26 and the control unit 28 for evaluation at the control unit 28. The control unit 28 evaluates the signal from the detector 26 in that the reference point 38 of the laser beam 20, in particular the cross-sectional surface thereby produced, and the reference point 31 of the absolute reference mark, in particular the cross-sectional surface thereby produced, is calculated and/or defined by the control unit 28. The reference points 31, 38 are each illustrated by means of a cruciform marking on the reference surface 30. The control unit 28 then evaluates a target-actual deviation 33 between the reference points 31, 38 in that it determines a distance between the reference points 31, 38 and transmits, for correction of the corresponding setting of the laser scanner unit 2, a signal via the signal connection 29 between the control unit 28 and the laser scanner unit 2. If necessary, the procedure is repeated until the reference point 38 of the laser beam 20 of the laser scanner unit 2 lies over the reference point 31 of the electromagnetic beam 25 of the device 24. According to this manner of proceeding, a position calibration is thus carried out by means of an absolute reference mark and a general detector 26. In the case of a multi-scanner PBLM system 11, this position calibration can be carried out analogously at each further one of the laser scanner units 2.

FIG. 5a shows a schematic illustration after the position calibration described in relation to FIG. 5. The reference points 31 and 38 in this case lie one above the other owing to the position calibration carried out.

Figure 6A:
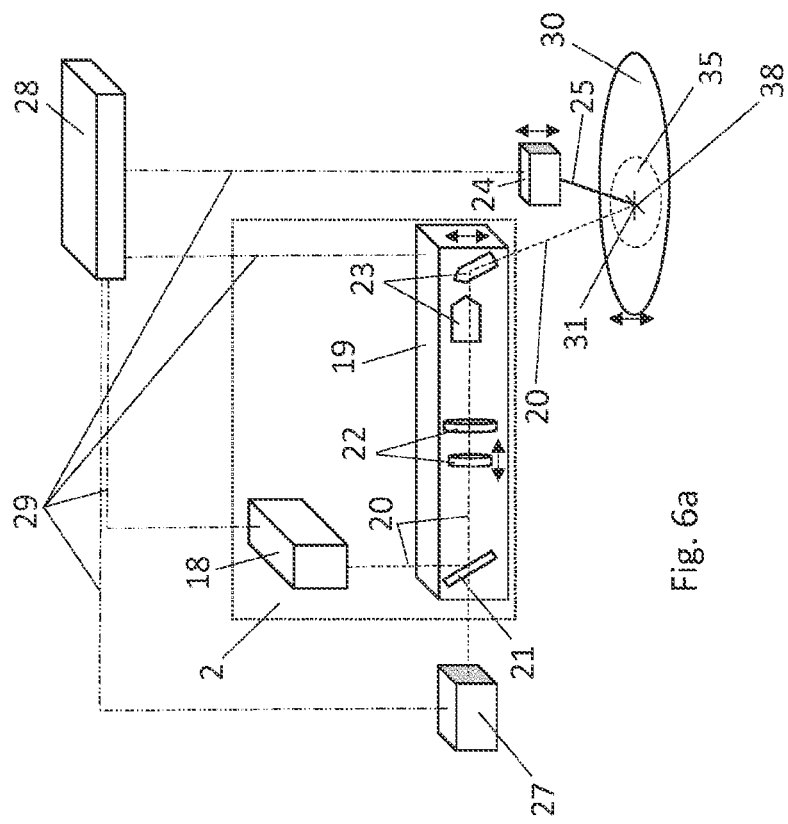
FIG. 6a shows a schematic illustration after the position calibration depicted in FIG. 6.
Figure 6:
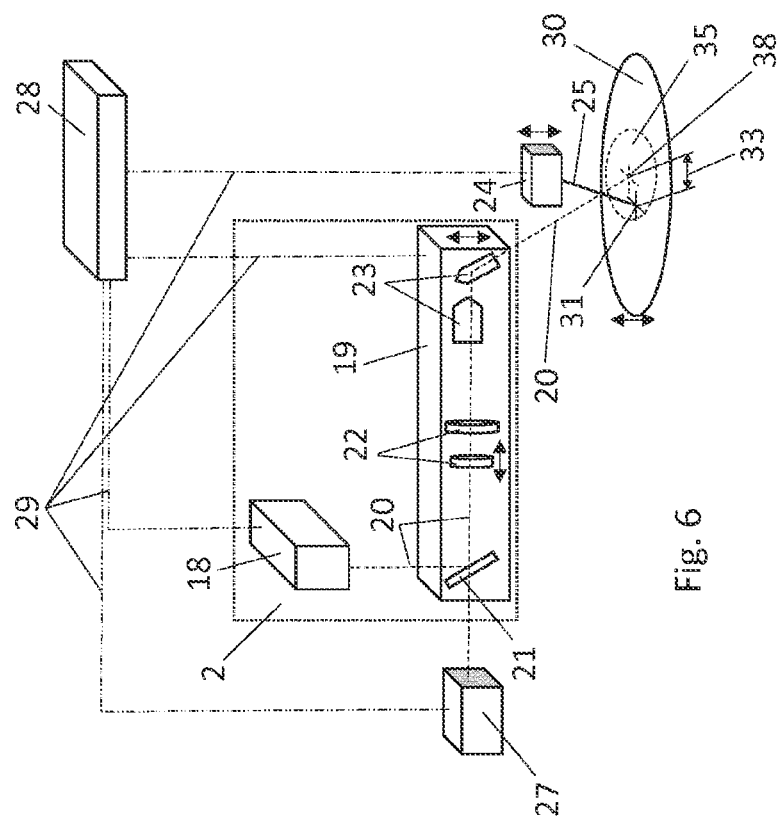
FIG. 6 shows a schematic illustration of a position calibration of the laser scanner unit of the PBLM system by means of an absolute reference mark and of a local detector.

FIG. 6 shows a schematic illustration of a position calibration of the beam source deflection unit 2 of the PBLM system 1 by means of an absolute reference mark and of a local detector 27. In contrast to the position calibration according to FIG. 5, a local detector instead of a general one is used. The local detector 27 has a detection range 35 which is smaller than the reference surface 30 and is allocated to the laser scanner unit 2. In order that the local detector 27 can detect the cross-sectional surface of the absolute reference mark and the cross-sectional surface of the laser beam 20, which is generated by the laser scanner unit 2 allocated to said detector, the deflecting mirror 21 is designed and arranged to be partially permeable in such a way that appropriate electromagnetic beams can penetrate through it, which beams are reflected by the reference surface 30. Otherwise, the statements relating to FIG. 5 also apply to the embodiment illustrated in FIG. 6.

FIG. 6a shows a schematic illustration after the position calibration described in relation to FIG. 6. The reference points 31 and 38 in this case lie one above the other owing to the position calibration carried out.

Figure 7A:
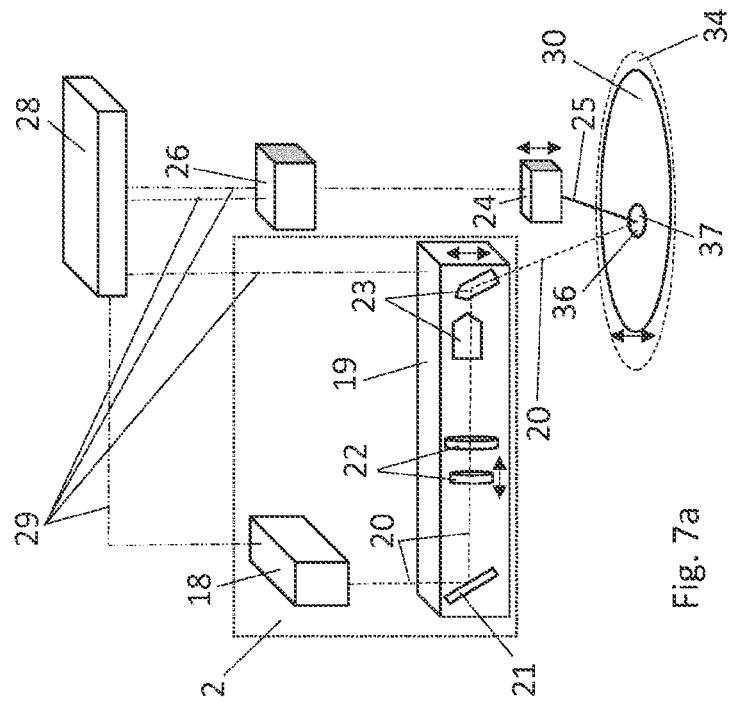
FIG. 7a shows a schematic illustration after the focus calibration described in relation to FIG. 7.
Figure 7:
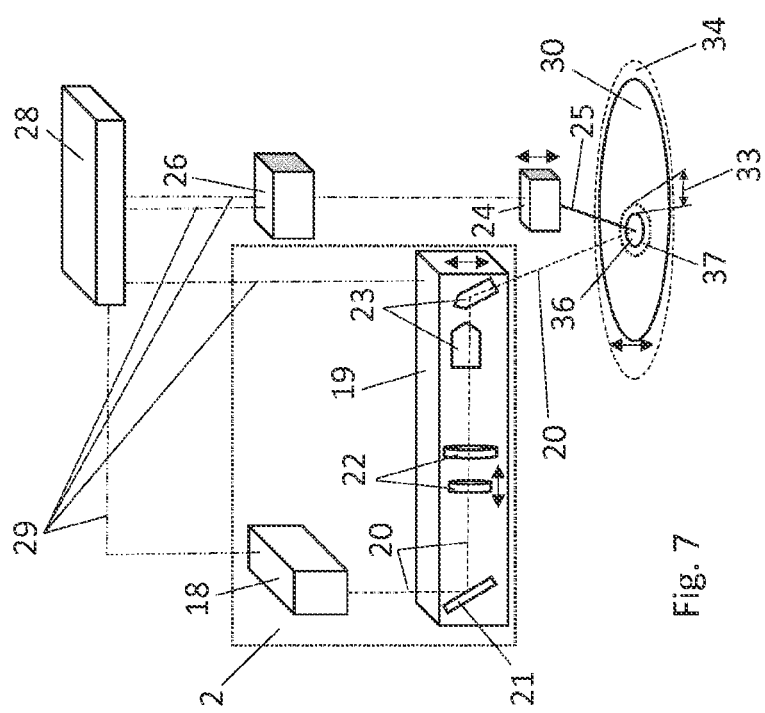
FIG. 7 shows a schematic illustration of a focus calibration of the laser scanner unit of the PBLM system by means of an absolute reference mark and of a general detector.

FIG. 7 shows a schematic illustration of a focus calibration of the laser scanner unit 2 of the PBLM system 1 by means of an absolute reference mark, projected by the device 24 onto the reference surface 30, and of a general detector 26. During the focus calibration, instead of the target-actual deviation 33 between the reference points of the laser beam 20 and of the electromagnetic beam 25, the target-actual deviation 33 between the lateral actual expansion 37 of the laser beam 20 and the lateral actual expansion 36 of the electromagnetic beam 25 is determined. The lateral actual expansion 37 of the laser beam 20 and the lateral actual expansion 36 of the electromagnetic beam 25 are illustrated by means of a round marking on the reference surface 30. The lateral actual expansion 37 of the laser beam 20 in this example is larger than the lateral actual expansion 36 of the electromagnetic beam 25. After appropriate evaluation by the control unit 28, the laser scanner unit 2 is actuated by the control unit 28 via the signal connection 29 between the control unit 28 and the laser scanner unit 2. The setting of the laser scanner unit 2 and in particular of the movable focussing lens(es) 22 is changed in such a way that the lateral actual expansion 37 of the laser beam 20 matches the lateral actual expansion 36 of the electromagnetic beam 25. Otherwise, the statements relating to FIG. 5 also apply to the embodiment illustrated in FIG. 7.

FIG. 7a shows a schematic illustration after the focus calibration described in relation to FIG. 7. The lateral actual expansions 37 and 36 in this case lie congruently one above the other owing to the focus calibration carried out.

Figure 8A:
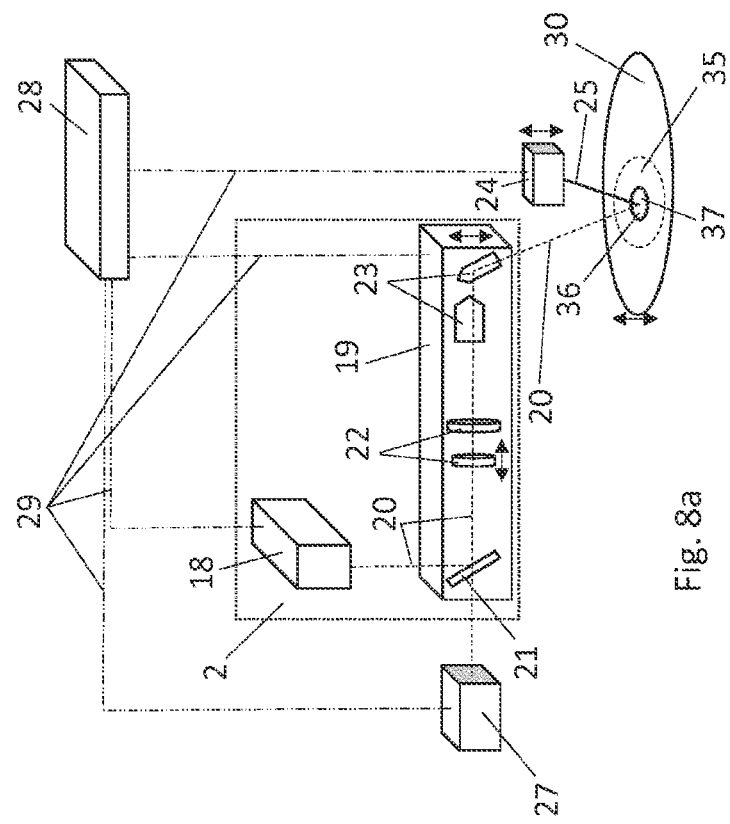
FIG. 8a shows a schematic illustration after the focus calibration depicted in FIG. 8.
Figure 8:
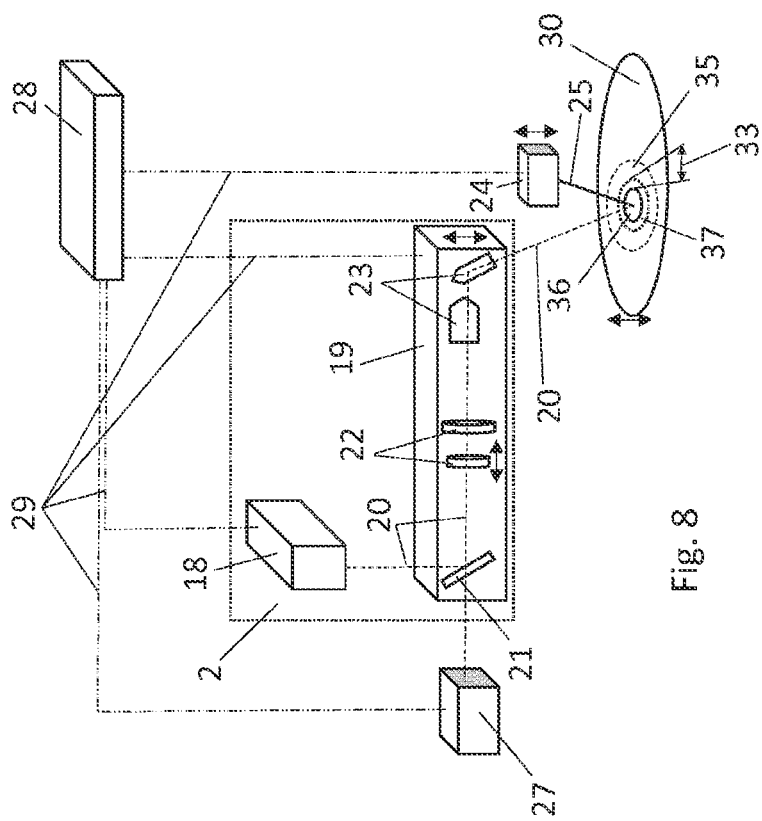
FIG. 8 shows a schematic illustration of a focus calibration of the laser scanner unit of the PBLM system by means of an absolute reference mark and of a local detector.

FIG. 8 shows a schematic illustration of a focus calibration of the laser scanner unit 2 of the PBLM system 1 by means of an absolute reference mark, projected by the device 24 onto the reference surface 30, and of a local detector 27. In contrast to the focus calibration by means of a general detector 26, in this embodiment a local detector 27 is used. Otherwise, the statements relating to FIGS. 5, 6 and 7 also apply to the embodiment illustrated in FIG. 8.

FIG. 8a shows a schematic illustration after the focus calibration described in relation to FIG. 8. The lateral actual expansions 37 and 36 in this case lie congruently one above the other owing to the focus calibration carried out.

Figure 9:
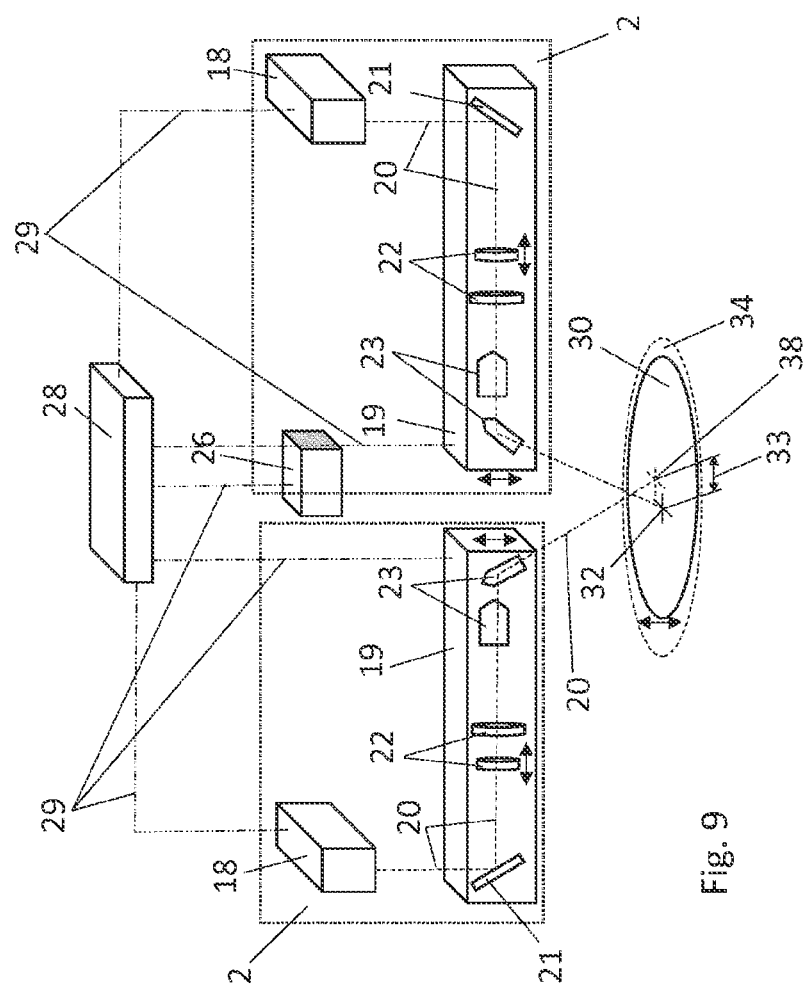
FIG. 9 shows a schematic illustration of a position calibration of one of two laser scanners units of the multi-scanner PBLM system by means of a relative reference mark and of a general detector.

FIG. 9 shows a schematic illustration of a position calibration of one of two laser scanner units 2 of the multi-scanner PBLM system 11 by means of a virtual relative reference mark and of a general detector 26. The multi-scanner PBLM system 11 comprises two laser scanner units 2. One laser scanner unit 2 is calibrated by means of the other laser scanner unit 2. For this purpose, the laser scanner unit 2 generates a laser beam 20 which is projected onto the reference surface 30 and serves as a virtual relative reference mark. The reference point 32 of this relative reference mark is calculated and/or defined by the control unit 28 and is illustrated on the reference surface 30 by means of a cruciform marking. Subsequently or at the same time, the other laser scanner unit 2 generates a laser beam 20 and projects it onto the reference surface 30. The reference point 38 of the laser beam 20 is calculated and/or defined by the control unit 28 and is also illustrated on the reference surface 30 by means of a cruciform marking. Otherwise, the statements relating to FIG. 5 also apply to the embodiment illustrated in FIG. 9, wherein instead of the absolute reference mark the relative reference mark of one laser scanner unit 2 is used.

Figure 9A:
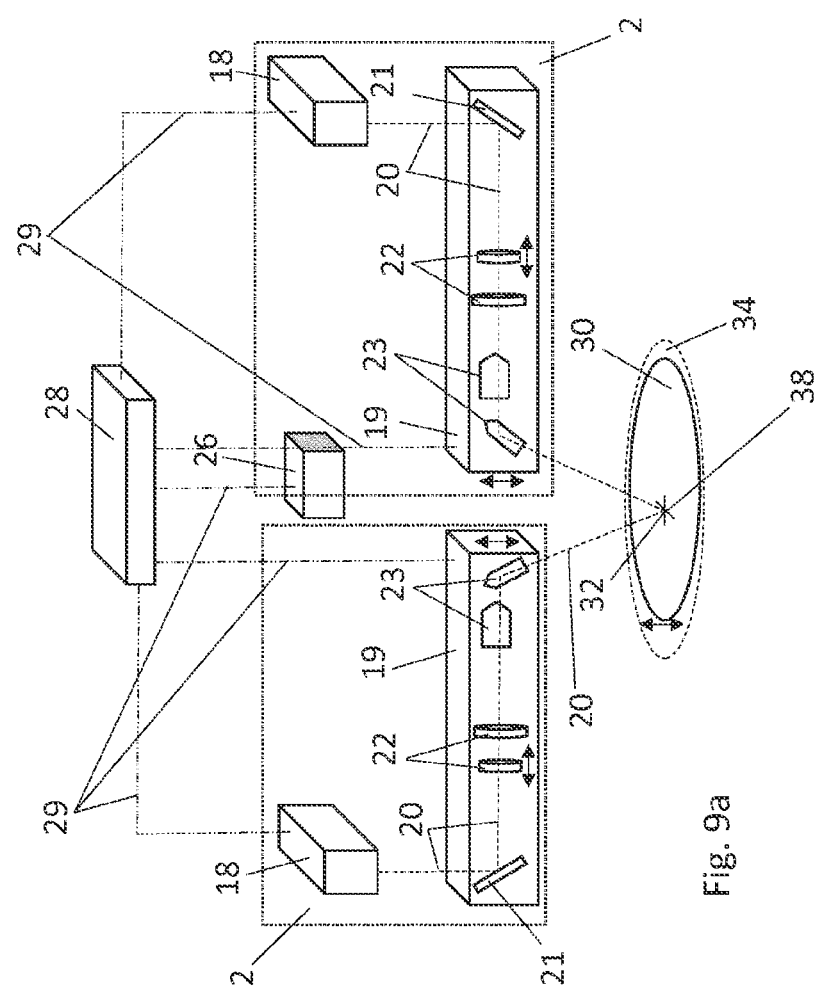
FIG. 9a shows a schematic illustration after the position calibration described in relation to FIG. 9.

FIG. 9a shows a schematic illustration after the position calibration described in relation to FIG. 9. The reference points 32 and 38 in this case lie one above the other as a result of the position calibration.

FIG. 10 shows a schematic illustration of a position calibration of one of two laser scanner units 2 of the multi-scanner PBLM system 11 by means of a relative reference mark and of a local detector 27. In contrast to the embodiment illustrated in FIG. 9, instead of the general detector 26, two local detectors 27, allocated to the laser scanner units 2 respectively, are used in order to determine the target-actual deviation 33. However, it will suffice for only one of the two laser scanner units 2 to be allocated a corresponding local detector 27. Otherwise, the statements relating to FIGS. 6 and 9 also apply to the embodiment illustrated in FIG. 10.

Figure 10A:
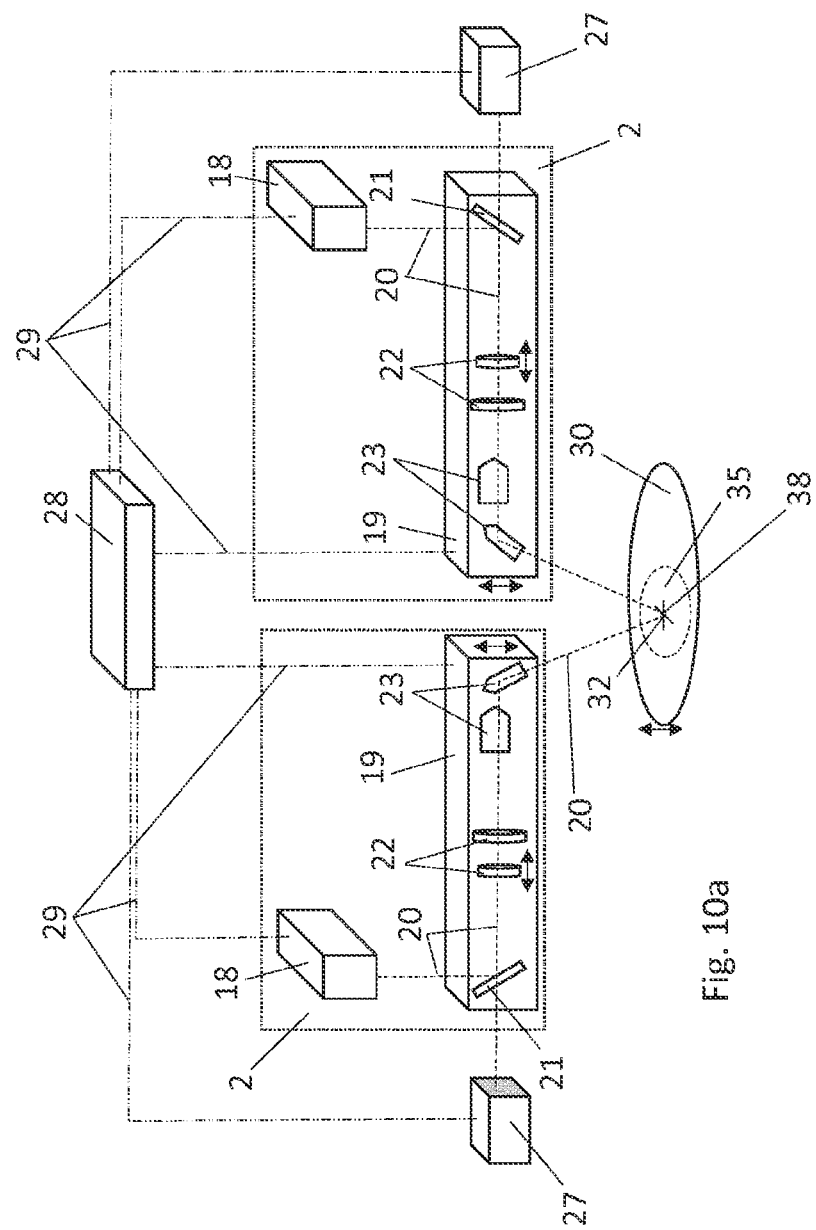
FIG. 10a shows a schematic illustration after the position calibration described in relation to FIG. 10.

FIG. 10a shows a schematic illustration after the position calibration described in relation to FIG. 10. The reference points 32 and 38 in this case lie one above the other as a result of the position calibration.

Figure 11A:
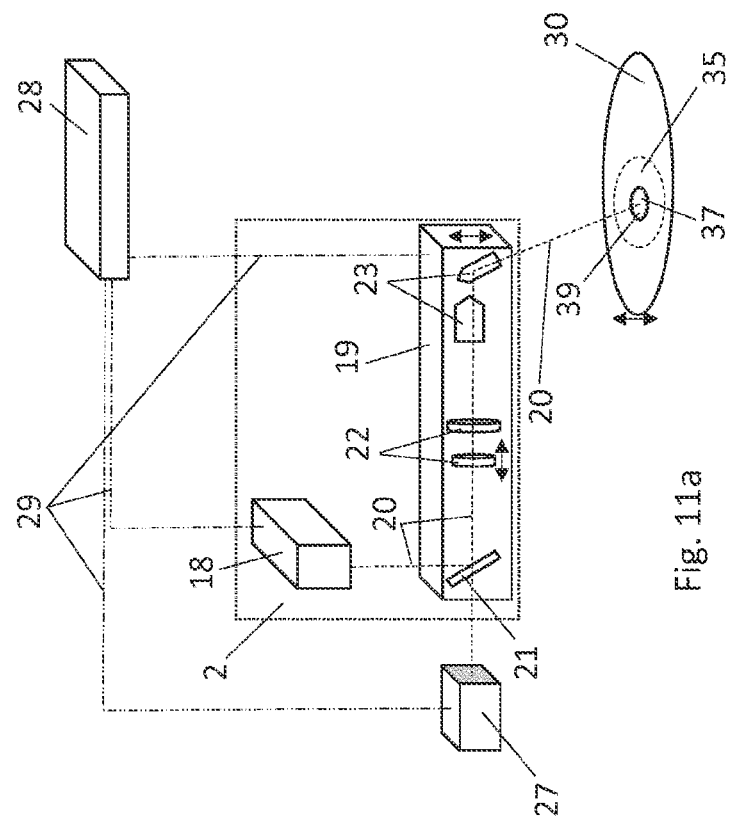
FIG. 11a shows a schematic illustration after the focus calibration described in relation to FIG. 11.
Figure 11:
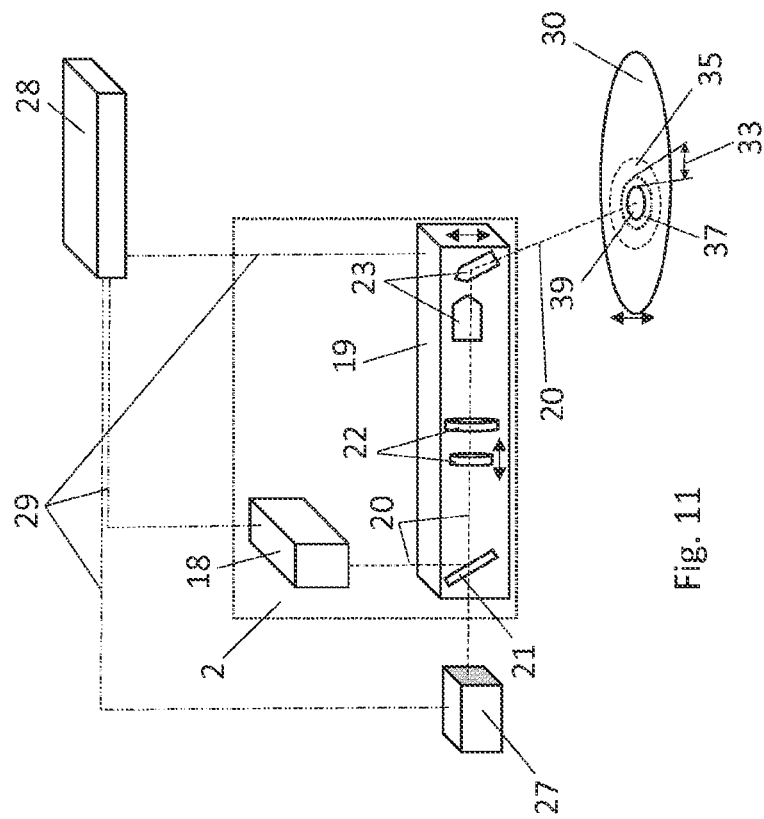
FIG. 11 shows a schematic illustration of a focus calibration of the laser scanner unit of the PBLM system by means of a local detector.

FIG. 11 shows a schematic illustration of a focus calibration of the laser scanner unit 2 of the PBLM system 1 by means of a local detector 27. In contrast to the focus calibration by means of an absolute reference mark, projected by the device 24 onto the reference surface 30, and of a local detector 27, no absolute reference mark is used in this embodiment. The lateral target expansion 39 is preset and is used by the control unit 28 to evaluate the target-actual deviation 33. The presetting can arise e.g. from an arithmetical or iterative determination of the target expansion, which is carried out during the evaluation of the target-actual deviation 33. Otherwise, the statements relating to FIGS. 5, 6 and 7 also apply to the embodiment illustrated in FIG. 11.

FIG. 11a shows a schematic illustration of the laser scanner unit 2 of the PBLM system 1 after the focus calibration described in relation to FIG. 11. The lateral actual expansion 37 and the lateral target expansion 39 of the laser beam 20 in this case lie congruently one above the other owing to the focus calibration carried out.

The invention claimed is:

1. A calibration method for a powder-bed-based laser melting (PBLM) system for powder-bed-based production of three-dimensional components via electromagnetic radiation where the system comprises a working plane, a plurality of beam source deflection units each comprising at least one deflecting mirror and each configured to provide a laser beam, and a support plate that can be raised and lowered and above which a component is built up, wherein the laser beam provided by each beam source deflection unit is produced by an individual laser beam source, the method comprising:

projecting at least one virtual reference mark onto a reference surface that can be moved vertically via the support plate; and determining with a detector a target-actual deviation between the at least one virtual reference mark and a laser beam of one of the beam source deflection units for calibration of that said one of the beam source deflection units;

wherein each of the beam source deflection units with its respective at least one deflecting mirror is moveable in the vertical direction and the projecting the at least one virtual reference mark is projected onto the reference surface independently of whether the vertical position of the reference surface is below, above or in the working plane of the system; and wherein the at least one virtual reference mark comprises a relative reference mark provided by the laser beam of another one of the beam source deflection units.

2. The calibration method as claimed in claim 1, wherein the at least one virtual reference mark further comprises an absolute reference mark produced by a projection device that is different from the beam source deflection units.

3. The calibration method as claimed in claim 2, further comprising carrying out a focus calibration of a selected beam source deflection unit using the at least one absolute reference mark, and for this purpose determining the target-actual deviation between the absolute reference mark and the laser beam of the selected beam source deflection unit using the detector, and correcting a setting of the selected beam source deflection unit and/or of the laser beam of the selected beam source deflection unit in order to minimize or eliminate the determined target-actual deviation or to adjust it to a desired value.

4. The calibration method as claimed in claim 2, further comprising carrying out a position calibration of a selected beam source deflection unit using the at least one absolute reference mark, and for this purpose determining the target-actual deviation between the absolute reference mark and the laser beam of the selected beam source deflection unit using the detector and correcting a setting of the selected beam source deflection unit and/or of the laser beam of the selected beam source deflection unit in order to minimize or eliminate the determined target-actual deviation or to adjust it to a desired value.

5. The calibration method as claimed in claim 3, wherein said method further comprises carrying out a focus calibration of additional beam source deflection units of the plurality of beam source deflection units using the at least one absolute reference mark.

6. The calibration method as claimed in claim 4, wherein said method further comprises carrying out a position calibration of additional beam source deflection units of the plurality of beam source deflection units using the at least one absolute reference mark.

7. The calibration method as claimed in claim 1, wherein the at least one virtual reference mark is produced by a laser beam which has an intensity which does not cause any melting of powder for the PBLM system.

8. The calibration method of claim 3, wherein the selected beam source deflection unit comprises the said another one of the beam source deflection units and defines a first beam source deflection unit that provides the at least one virtual reference mark that comprises the relative reference mark, said method further comprising, after the focus calibration of the first beam source deflection unit using the at least one absolute reference mark, carrying out a focus calibration of one or more additional beam source deflection units of the plurality of beam source deflection units using the first beam source deflection unit, and for this purpose determining a target-actual deviation between the laser beam of the first beam source deflection unit that produces the relative reference mark and the laser beam of the one or more additional beam source deflection units, and correcting a setting of the one or more additional beam source deflection units and/or correcting the laser beams of the one or more additional beam source deflection units in order to minimize or eliminate the determined target-actual deviation or to adjust it to a desired value.

9. The calibration method as claimed in claim 7, said method further comprising carrying out a position calibration of one or more additional beam source deflection units of the plurality of beam source deflection units in relation to the relative reference mark, and for this purpose determining a target-actual deviation between the relative reference mark and a beam of the one or more additional beam source deflection units using the detector and correcting a setting of the one or more additional beam source deflection units and/or of the laser beam of the one or more additional beam source deflection units in order to minimize or eliminate the determined target-actual deviation or to adjust it to a desired value.

10. The calibration method as claimed in claim 1, wherein the detector comprises a general detector and is used for position calibration and/or focus calibration and is disposed above the reference surface and comprises a camera and is used for determination of a target-actual deviation between each reference mark and the beam of said plurality of beam source deflection units.

11. The calibration method as claimed in claim 1, wherein the detector comprises a local detector and is used for position calibration and/or focus calibration and is allocated to a particular beam source deflection unit and comprises a camera and is used for determination of a target-actual deviation between each reference mark and the laser beam of the particular beam source deflection unit allocated to said detector.

12. The calibration method as claimed in claim 1, further comprising carrying out a focus calibration of a selected beam source deflection unit using the detector and for this purpose determining a target-actual deviation between a lateral target expansion and/or target intensity, preset for the laser beam generated by the selected beam source deflection unit, and a lateral actual expansion and/or actual intensity of the laser beam generated by the selected beam source deflection unit, and correcting a setting of the selected beam source deflection unit and/or of the laser beam of the selected beam source deflection unit in order to minimize or eliminate the determined target-actual deviation or to adjust it to a desired value.

13. The calibration method as claimed in claim 4, wherein the position calibration and/or the focus calibration is carried out prior to and/or during a build job.

14. The calibration method as claimed in claim 1, wherein the system further includes a control unit configured to control the system for projecting the at least one virtual reference mark and determining the target-actual deviation.

15. The calibration method as claimed in claim 2, further comprising carrying out a focus calibration of the said another one of the beam source deflection units using the at least one absolute reference mark and further comprising carrying out a position calibration of the said another one of the beam source deflection units using the at least one absolute reference mark, and for this purpose determining the target-actual deviation between the absolute reference mark and the laser beam of the said another one of the beam source deflection units using the detector and correcting a setting of the said another one of the beam source deflection units and/or of the laser beam of the said another one of the beam source deflection units in order to minimize or eliminate the determined target-actual deviation or to adjust it to a desired value.

16. The calibration method as claimed in claim 15, wherein said method further comprises carrying out a focus calibration of one or more additional beam deflection units of the plurality of beam source deflection units using the at least one absolute reference mark.

17. The calibration method as claimed in claim 16, wherein said method further comprises carrying out a position calibration of one or more additional beam deflection units of the plurality of beam source deflection units using the at least one absolute reference mark.

* * * * *